(12) United States Patent
Turnquist et al.

(10) Patent No.: US 8,262,349 B2
(45) Date of Patent: Sep. 11, 2012

(54) ADAPTIVE COMPLIANT PLATE SEAL ASSEMBLIES AND METHODS

(75) Inventors: Norman Arnold Turnquist, Sloansville, NY (US); Bernard Arthur Courture, Jr., Schenectady, NY (US); Mark William Kowalczyk, Amsterdam, NY (US); Frederick George Baily, Ballston Spa, NY (US); Mark Edward Burnett, Barton, NY (US)

(73) Assignee: General Electric Company, Niskayuna, NY (US)

( * ) Notice: Subject to any disclaimer, the term of this patent is extended or adjusted under 35 U.S.C. 154(b) by 807 days.

(21) Appl. No.: 12/340,779

(22) Filed: Dec. 22, 2008

(65) Prior Publication Data
US 2010/0158674 A1 Jun. 24, 2010

(51) Int. Cl.
*F01D 5/20* (2006.01)
(52) U.S. Cl. ............... 415/173.4; 277/412; 277/413; 277/593
(58) Field of Classification Search ............ 415/173.4; 277/412, 413, 593
See application file for complete search history.

(56) References Cited

U.S. PATENT DOCUMENTS

| | | | |
|---|---|---|---|
| 5,135,237 A | 8/1992 | Flower | |
| 6,343,792 B1 | 2/2002 | Shinohara et al. | |
| 6,786,487 B2 | 9/2004 | Dinc et al. | |
| 7,066,470 B2 | 6/2006 | Turnquist et al. | |
| 7,287,956 B2 | 10/2007 | Bracken et al. | |
| 2003/0102630 A1 | 6/2003 | Dinc et al. | |
| 2007/0085277 A1 | 4/2007 | Rhodes et al. | |
| 2008/0169616 A1* | 7/2008 | Awtar et al. | 277/593 |

FOREIGN PATENT DOCUMENTS

| | | |
|---|---|---|
| EP | 1433987 A2 | 6/2004 |
| EP | 1503045 A2 | 2/2005 |
| WO | 2006042866 A1 | 4/2006 |

OTHER PUBLICATIONS

EP09178145 Search Report, Apr. 15, 2010.

* cited by examiner

*Primary Examiner* — Edward Wojciechowicz
(74) *Attorney, Agent, or Firm* — Ann M. Agosti

(57) ABSTRACT

A steam turbine comprises a steam turbine casing, a rotor, and at least one compliant plate seal assembly situated between the casing and the rotor. The compliant plate seal assembly comprises a supporting member being stationary with respect to the casing, a plurality of plate members movably mounted to the supporting member and extending towards the rotor, each plate member being inclined with respect to a rotation direction of the rotor, and an actuator for selectively exerting a pressure to retract the plate members in a direction away from the rotor.

11 Claims, 8 Drawing Sheets

ADAPTIVE COMPLIANT PLATE SEAL ASSEMBLIES AND METHODS

BACKGROUND

The invention relates to seal assemblies.

Seal assemblies are widely used between rotating and stationary elements. For example, a steam turbine typically includes, in serial-flow relationship, a steam inlet, a turbine, and a steam outlet. Steam leakage, either out of the steam path or into the steam path, from an area of higher pressure to an area of lower pressure may adversely affect the operating efficiency of the turbine. Accordingly, seal assemblies are provided between the rotor and surrounding casing (stator) for minimizing steam leakage.

A seal assembly is typically attached to the rotor or casing, and is, during steady state operation of the turbine, either in a friction fit or situated so as to provide a small gap between the rotor and the casing. It is desirable for seal assemblies to have long useful lives so as to minimize the need for maintenance and repair. However, during transient operations, such as start up or shut down of the turbine, the rotor may deflect towards the surrounding seal and therefore cause undesirable rubbing. Accordingly, seal assemblies may become adversely worn and thus suffer from a shortened useful life and reduced sealing effectiveness. Furthermore, seal assemblies are also subject to differential thermal expansion and contraction movement with the rotor during transient operation which can also cause undesirable rubbing.

It would be desirable to have an improved seal assembly and sealing method to accommodate relative transient movement of the rotor and stator.

BRIEF DESCRIPTION

In accordance with an embodiment disclosed herein, a steam turbine comprises a steam turbine casing, a rotor, and at least one compliant plate seal assembly situated between the casing and the rotor. The compliant plate seal assembly comprises a supporting member being stationary with respect to the casing, a plurality of plate members movably mounted to the supporting member and extending towards the rotor, each plate member being inclined with respect to a rotation direction of the rotor, and an actuator for selectively exerting a pressure to retract the plate members in a direction away from the rotor.

In accordance with another embodiment disclosed herein, a seal assembly comprises at least one compliant plate seal assembly situated between a stator and a rotor. The compliant plate seal assembly comprises a supporting member being stationary with respect to the stator, a plate support being movably mounted to the supporting member, a plurality of plate members mounted to plate support and extending towards the rotor, and an actuator for selectively exerting a pressure to retract the plate members in a direction away from the rotor. Each plate member is inclined with respect to a rotation direction of the rotor. The plate support further comprises at least one supplementary sealing portion extending towards the rotor and comprising an abradable material on a rotor facing end. The rotor is provided with projections oriented substantially perpendicularly with respect to the supplementary sealing portion.

In accordance with still another embodiment disclosed herein, a seal assembly, for providing sealing effect between a casing and a rotor surrounded by the casing, comprises at least one seal assembly situated between the casing and the rotor. The seal assembly comprises a supporting member being stationary with respect to the casing, a plurality of sealing portions movably mounted to the supporting member and extending towards the rotor, and an actuator for selectively exerting a pressure to retract the sealing portions in a direction away from the rotor. The actuator comprises a carrier, a plurality of bores in the carrier, a plurality of compression members between the supporting member and the seal assembly, and a trigger device for selectively exerting a pressure force to lift the compression members. The carrier comprises a plurality of carrier segments. The bores in a common carrier segment are in communication with each other, and the bores of different carrier segments are isolated from each other.

In accordance with still another embodiment disclosed herein, a sealing method comprises providing at least one compliant plate seal assembly between a casing and a rotor which comprises a supporting member being stationary with respect to the casing and a plurality of plate members movably mounted to the supporting member and extending towards the rotor; and selectively exerting a pressure to retract the plate members in a direction away from the rotor during transient operation of the rotor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Different embodiments described herein relate to an active seal system between a rotor and a stator. The active seal system includes seal portions and an actuator for selectively exerting a pressure to retract the seal portions in a direction away from the rotor, and thus decrease friction between seal portions and the rotor. In one embodiment, the actuator retracts the seal portions during a transient operation of the rotor, for example start up or shut down operation of the rotor. In one embodiment, the active seal system is useful for steam turbines, or any other rotating machines sensitive to rotor frictional heating and having some degree of pressure in place during steady state operation. In particular embodiments described herein are useful when long flexible rotors are involved as is often the case for steam turbines and sometimes the case in rotary compressors, gas turbines, aircraft turbines, and the like.

Figure 1:
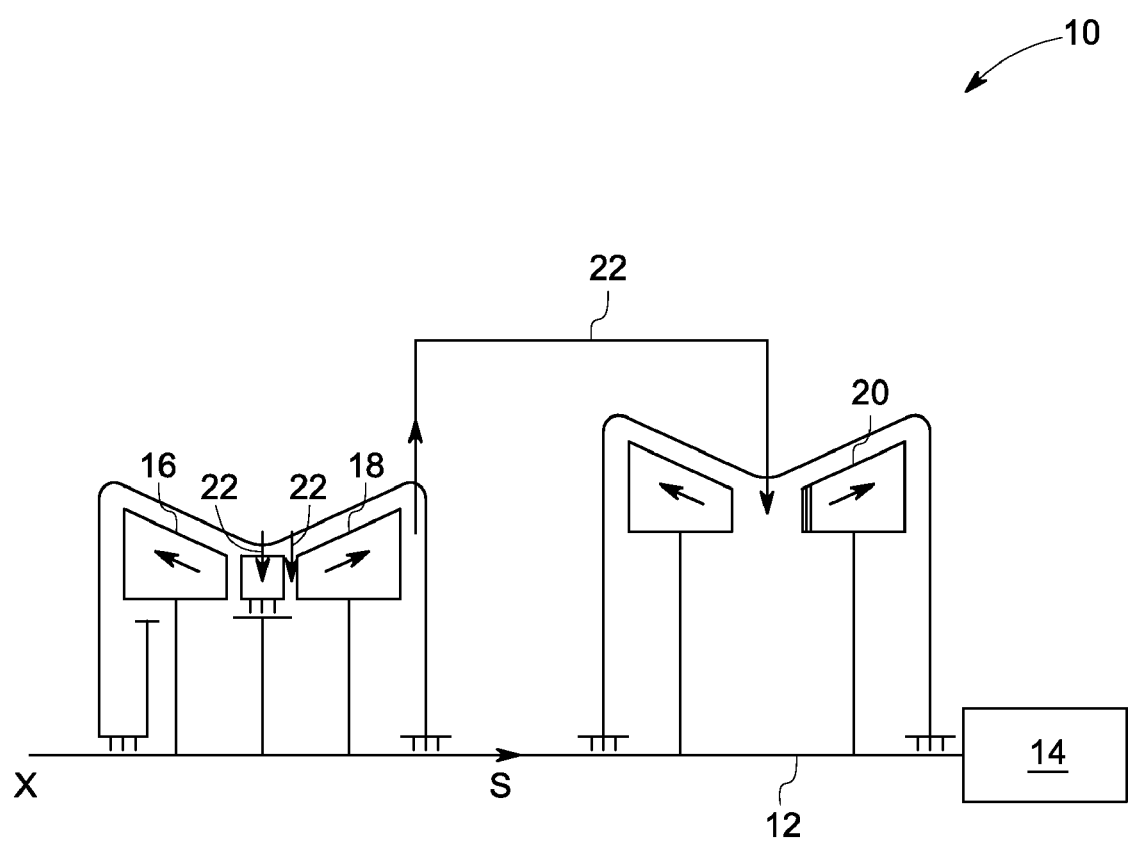
FIG. 1 is a partial block diagram of a top half of a steam turbine structure.

Referring to FIG. 1, an exemplary steam turbine 10 includes a rotor 12 for powering an electrical generator 14 joined thereto. Steam turbine 10 is essentially axisymmetrical about the longitudinal or axial centerline axis S extending through the rotor 12 and rotating about the axis S in a direction X. Steam turbine 10 may have any conventional configuration. For example, steam turbine 10 may include sections in the form of a high pressure turbine 16, an intermediate pressure turbine 18, and a low pressure turbine 20 all joined to the common rotor 12 for powering generator 14. In the steam turbine configuration, pressurized fluid 22 is hot, pressurized steam produced in a steam boiler (not shown). Steam turbine 10 includes sealing apparatuses between various locations of the common rotor 12 and stators (or surrounding casings). In one embodiment, rotor 12 is a long flexible rotor shaft. One example of length of rotor 12 is about 10 feet to 20 feet between bearings.

Figure 2:
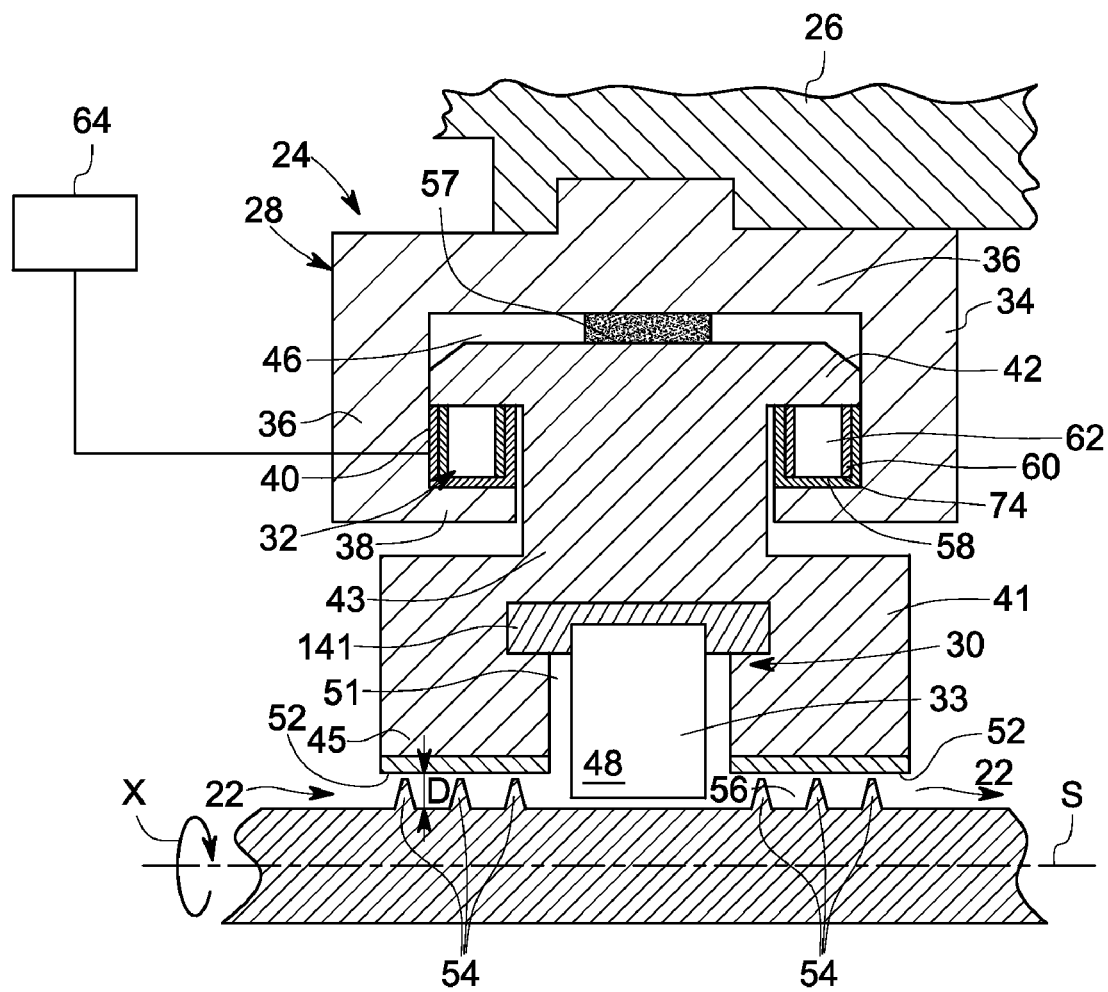
FIG. 2 is a sectional side view illustrating a seal assembly according to one embodiment of the invention.

FIG. 2 is a partial cross-sectional view of steam turbine 10 and illustrates an exemplary embodiment of a seal assembly 24 according to one embodiment. Seal assembly 24 includes an arcuate supporting member 28 mounted to casing 26, a seal packet 30 movably mounted in supporting member 28, and an actuator 32 for selectively retracting seal packet 30. Supporting member 28 may comprise a discrete member with respect to casing 26 as shown in FIG. 2, or may comprise an integral portion of casing 26 (not shown).

In the discrete supporting member embodiment, an exemplary supporting member 28 includes a roof 34 secured to casing 26, a pair of side walls 36 extending from the roof 34 towards rotor 12, a pair of hooks or ledges 38 extending towards each other from lower ends of the pair of side walls 36, and a cavity 40 defined between roof 34, side walls 36, and ledges 38.

In one embodiment, seal packet 30 comprises a plurality of plate members 48 which may be secured by any appropriate plate member support. In one embodiment, a plate member support 41 includes a shoulder 42 situated in cavity 40. A gap 46 is defined between shoulder 42 of plate member support 41 and roof 34 of supporting member 28. In one embodiment, actuator 32 is secured between shoulder 42 and the pair of ledges 38 for retracting the plate member support 41 and plate members 48 towards roof 34 of supporting member 28. In one embodiment, seal packet 30 further comprises at least one biasing element 57 in gap 46. The biasing element 57 is preloaded to bias plate members 48 towards rotor 12 during normal sealing conditions. In certain embodiments, plate member support 41 further comprises an intermediate portion 43 extending out of cavity 40, and a pair of supplementary sealing portions 45 extending from the intermediate portion 43 toward rotor 12. The pair of supplementary sealing portions 45 defines a slot 51 therebetween and a plate holder 141 may be used to secure plate members 48 in slot 51. In an alternative embodiment, plate member support 41 comprises only one supplementary sealing portion 45 extending towards rotor 12. In one embodiment, each plate member 48 comprises one end secured by plate member holder 141 of plate support 41 and another end or a sealing portion 44 in slot 51 and extending towards rotor 12.

Figure 3:
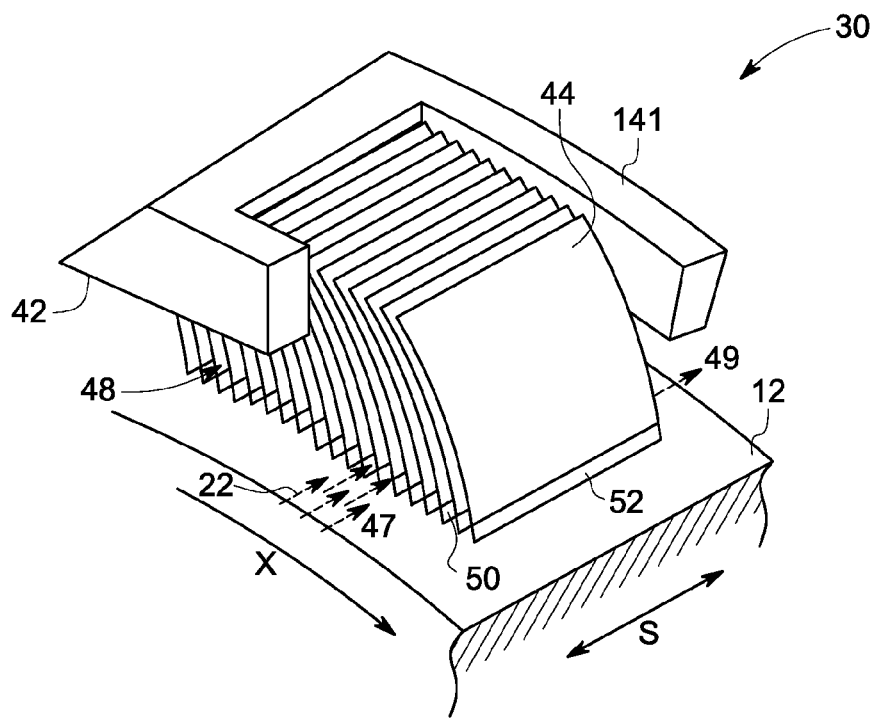
FIG. 3 is a perspective view illustrating an exemplary seal packet of the seal assembly of FIG. 2.

In another embodiment, no supplementary sealing portions are included. FIG. 3 is a partially cut away perspective view of seal packet 30 showing a plurality of tightly spaced-apart thin plate members 48 extending towards rotor 12. An exemplary plate member 48 has a height of 1 inches to 2 inches, a width of 0.2 inches to 1.0 inch in the longitudinal direction of rotor 12, and a thickness of 0.004 inches to 0.020 inches in the circumferential direction of rotor 12. A small gap 50 is defined between every two adjacent plate members 48. In one embodiment, gap 50 is between 0.0001 inches and 0.001 inches.

Plate members 48 seal an outer peripheral area of rotor 12 so that relevant space along the axis S of rotor 12 is divided into a high pressure area 47 and a lower pressure area 49. In certain embodiments, plate members 48 having predetermined widths in the axial direction of rotor 12 are tightly spaced-apart from one another in the circumferential direction of the rotor 12 in a multi-layered configuration, and thus have flexibility in the circumferential direction and high rigidity in the axial direction of rotor 12. In other words, seal plate members 48 are not easily deformed in the direction in which the differential pressure is applied between high pressure area 47 and low pressure area 49, in comparison with conventional brush seal arrangements.

Figure 4:
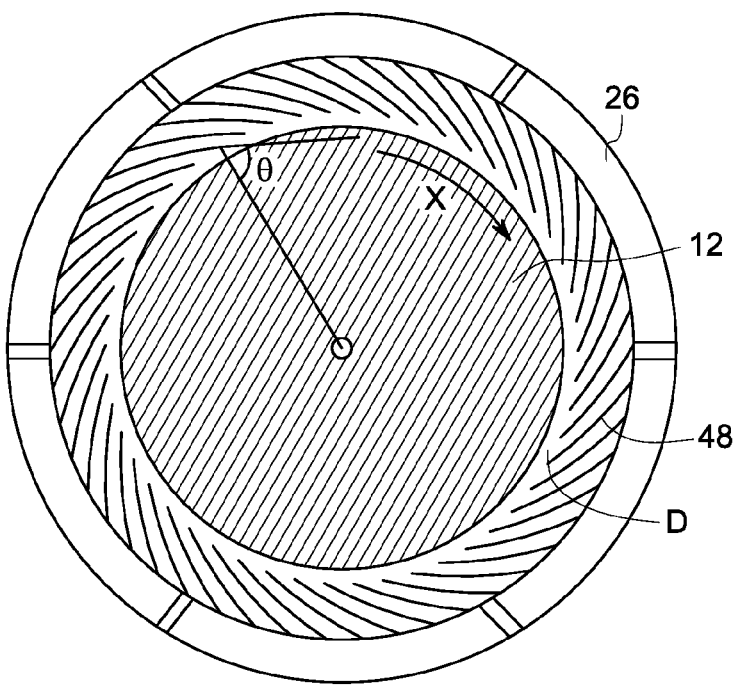
FIG. 4 is a cross-sectional view of a seal packet mounted between a rotor and a surrounding casing.

Referring to FIGS. 3 and 4, plate members 48 are designed to have a specific rigidity, dependent on the plate thickness in the circumferential direction of rotor 12. In addition, in one embodiment, plate members 48 are fixed to supporting member 28 in a manner such that plate members 48 are inclined with respect to the rotational direction X of the rotor so as to make an acute angle θ with the outer peripheral surface of rotor 12. Actuator 32 selectively retracts plate members 48 away from rotor 12 during transient operation, for example start up or shutdown operation, of steam turbine 10. During start up and shutdown, rotor 12 passes through critical speeds or frequencies and may experience associated eccentric orbiting. Other examples of transient conditions include differential thermal expansion and contraction that may occur between the rotor and casing or seal segments.

Referring back to FIG. 2, in one embodiment, seal assembly 24 is used in conjunction with an abradable seal assembly. A lower portion of each supplementary sealing portion 45 comprises an abradable material 52 on a rotor facing surface. Rotor 12 is provided with projections 54 and grooves 56 (shown in FIG. 2) oriented perpendicularly with respect to the abradable rotor facing surface. In certain embodiments, abradable material 52 is selected and applied for obtaining close clearances with the projections 54 of the rotor 12. For example, during operation, projections 54 wear away part of abradable material 52 leaving a profile (not shown) approximating that of projections 54 and grooves 56 on abradable material 52 and resulting in a closer clearance between the components.

The abradable material 52 may be of the type described and illustrated in commonly assigned Turnquist et al., U.S. Pat. No. 6,547,522 of common assignee herewith, the disclosure of which is incorporated herein by reference. In one example, the abradable material may comprise a composition having a first component including cobalt, nickel, chromium and yttrium and a second component selected from the group consisting of hexagonal boron nitride and a polymer.

Figure 5:
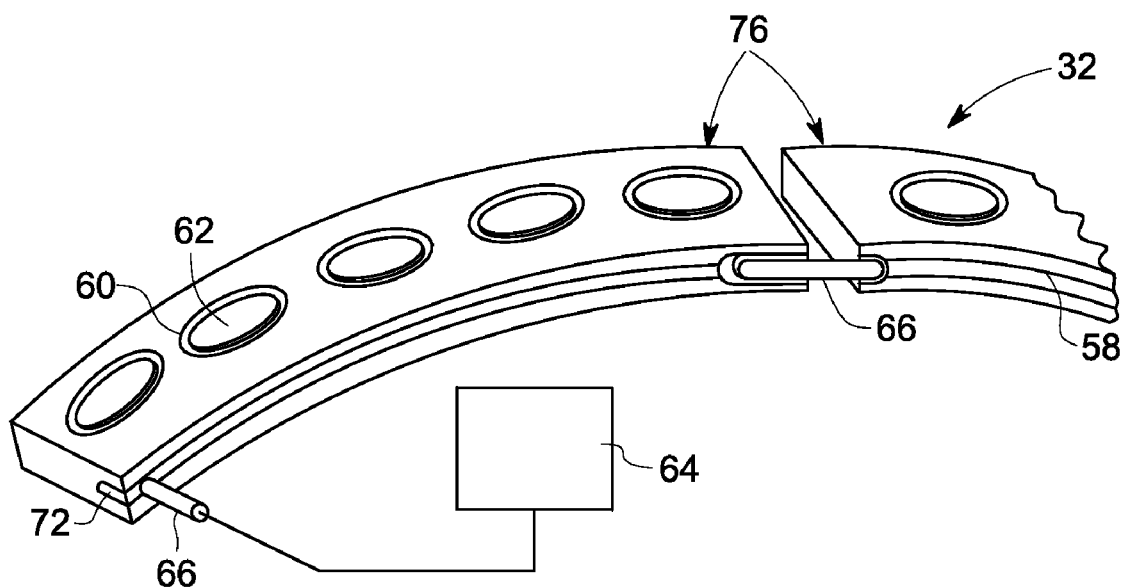
FIG. 5 is a perspective view of an exemplary actuator for retracting the seal packet in a direction away from the rotor.
Figure 6:
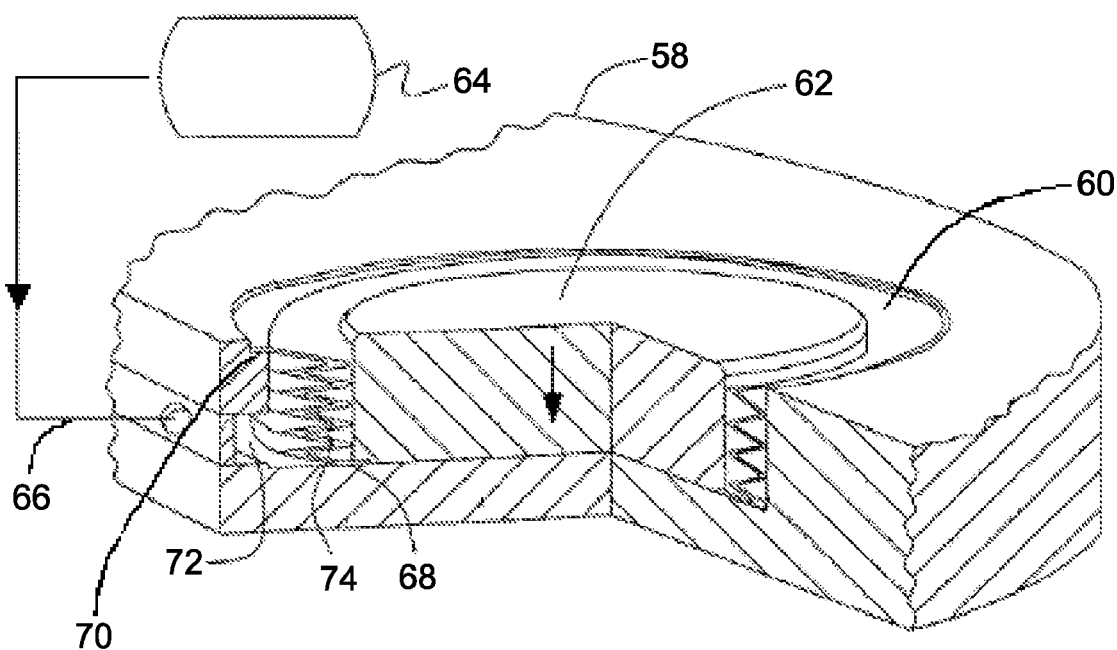
FIG. 6 is a partially cut away perspective view of enlarged portions of the actuator at a normal position.
Figure 7:
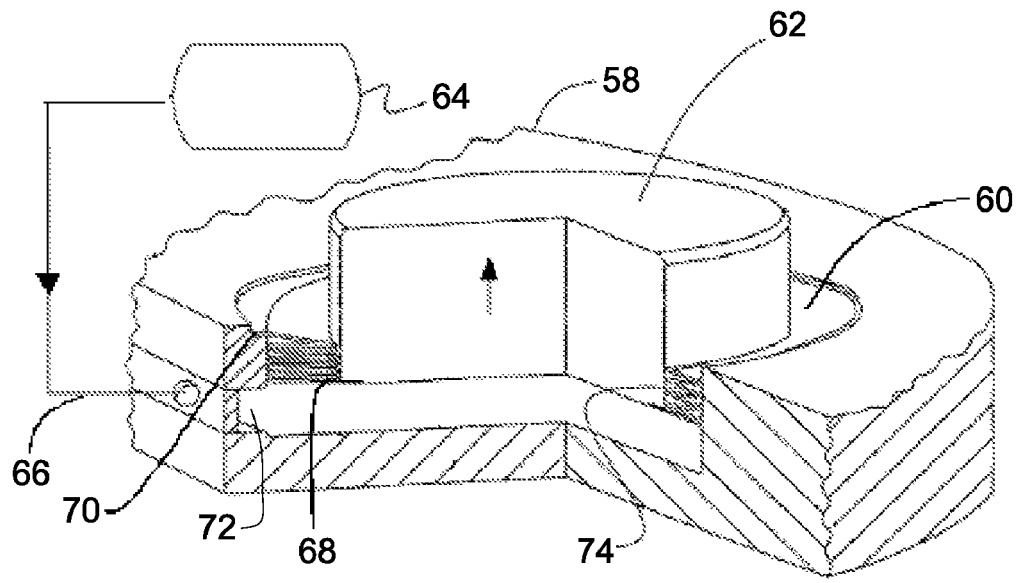
FIG. 7 is a partially cut away perspective view of enlarged portions of the actuator at a retracted position.

FIGS. 5-7 illustrate an exemplary actuator 32, according to one embodiment of the invention, for selectively retracting the seal assembly 24 in a direction away from rotor 12 during, for example, transient operation of steam turbine 10. Referring to FIG. 5, actuator 32 includes an annular carrier 58, a plurality of bores 60 defined in outer peripheral surface of the carrier 58, a plurality of pistons 62 elastically retained in corresponding bores 60, and at least one trigger device 64 for actuating the pistons.

FIGS. 6 and 7 illustrate enlarged portions of the actuator 32 including a piston 62 mounted in a corresponding bore 60 at a normal seal position (FIG. 6) and a retracted seal position (FIG. 7). In one embodiment, the piston 62 comprises a solid metal elastically attached to bore 60 through a compression bellow 74. Bellow 74 includes one end 68 sealingly joined to an outer portion of piston 62, for example, by welding, and another end 70 sealingly joined to a corresponding portion of the carrier 58 around an inner portion of bore 60, for example, by welding. In one embodiment, bores 60 in carrier 58 may be suitably joined in flow communication with each other by introducing a common arcuate manifold 72 along one side of carrier 58. Manifold 72 may be formed as a cut or recess along the side of carrier 58 and sealingly closed by a thin seal strip for providing flow continuity between bores 60.

In one embodiment, trigger device 64 is a pressure source for actuating pistons 62 so as to actuate retraction of the plate members by controlling the amount of gas in bellow 74 through conduits or pipes 66 via control valves (not shown). The gas may be air, or an inert gas such as argon or nitrogen, or any other suitable pressure fluid suitable for controlling gas in bellow 74 and thereby deploying piston 62 in the applicable configuration.

Referring back to FIG. 2, in one embodiment, two carriers 58 are disposed on the pair of ledges 38 of supporting member 28, and below shoulder 42 of seal packet 30. Accordingly, when the trigger device 64 is actuated for delivering pressurized gas into bores 60 of carrier 58, the pressurized gas overcomes the inward biasing force of biasing element 57 and pushes bellows 74 together causing pistons 62 to move upward, so as to push seal packet 30 to move upwardly towards roof 34 of supporting member 26. As pistons 62 are deployed with respect to rotor 12, plate members 48 are lifted relative to ledges 38 for increasing the radial gap D between the plate members 48 and rotor 12. In this way, orbiting or differential thermal movement of the rotor 12 will have more available radial space for preventing or limiting undesirable rubbing of the seal assembly and the rotor, especially during transient operation of steam turbine 10.

In the exemplary embodiment illustrated in FIG. 5, carrier 58 includes a plurality of carrier segments 76 adjoining circumferentially around the perimeter of rotor 12. The carrier segments 76 may be coupled with each other through suitable conduits 66. In one embodiment, conduits 66 may interconnect the manifolds 72 of adjoining carriers segments 76 for providing flow communication therebetween for channeling the pressurized gas thereto. In this way, trigger device 64 may channel the pressurized gas to one segment for series flow in turn to the adjoining seal segments for simultaneously deploying all pistons 62 therein.

Figure 8:
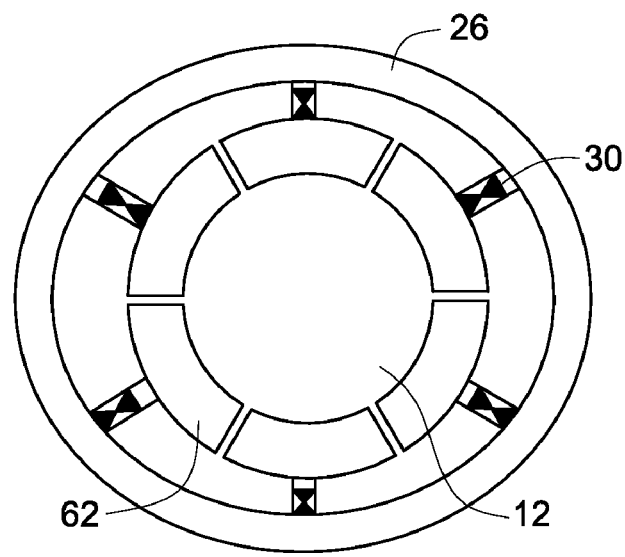
FIGS. 8 and 9 are sectional views of a seal assembly mounted between the rotor and the casing for compensating for an out-of-round casing and for compensating off-center conditions.
Figure 9:
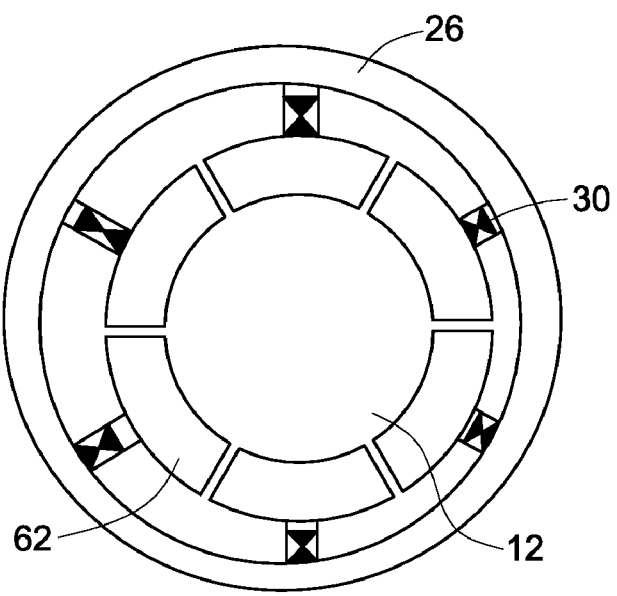

In another embodiment, manifolds 72 of different carrier segments 76 do not communicate with each other, and thus the carrier segments 76 are isolated from each other. Accordingly, trigger device 64 may includes a plurality of valves (not shown) to control any selective carrier segment 76. Thus, referring to FIGS. 8 and 9, seal segments 62 can be adjusted individually to compensate for an out-of-round casing 26, as illustrated in FIG. 8, or seal segments can be adjusted to compensate for off-center conditions due to misalignments or distortions as shown in FIG. 9.

In still another embodiment, seal assembly 24 comprises a plurality of sealing segments (not shown) along the circumferential direction of rotor 12, and each sealing segment includes a number of plate members 48. Accordingly, trigger device 64 selectively triggers individual carrier segment 76 and further can selectively retract the corresponding sealing segment to compensate for out-of-round casing 26, or to compensate for off-center conditions due to misalignments or distortions as shown in FIGS. 8 and 9.

Figure 10:
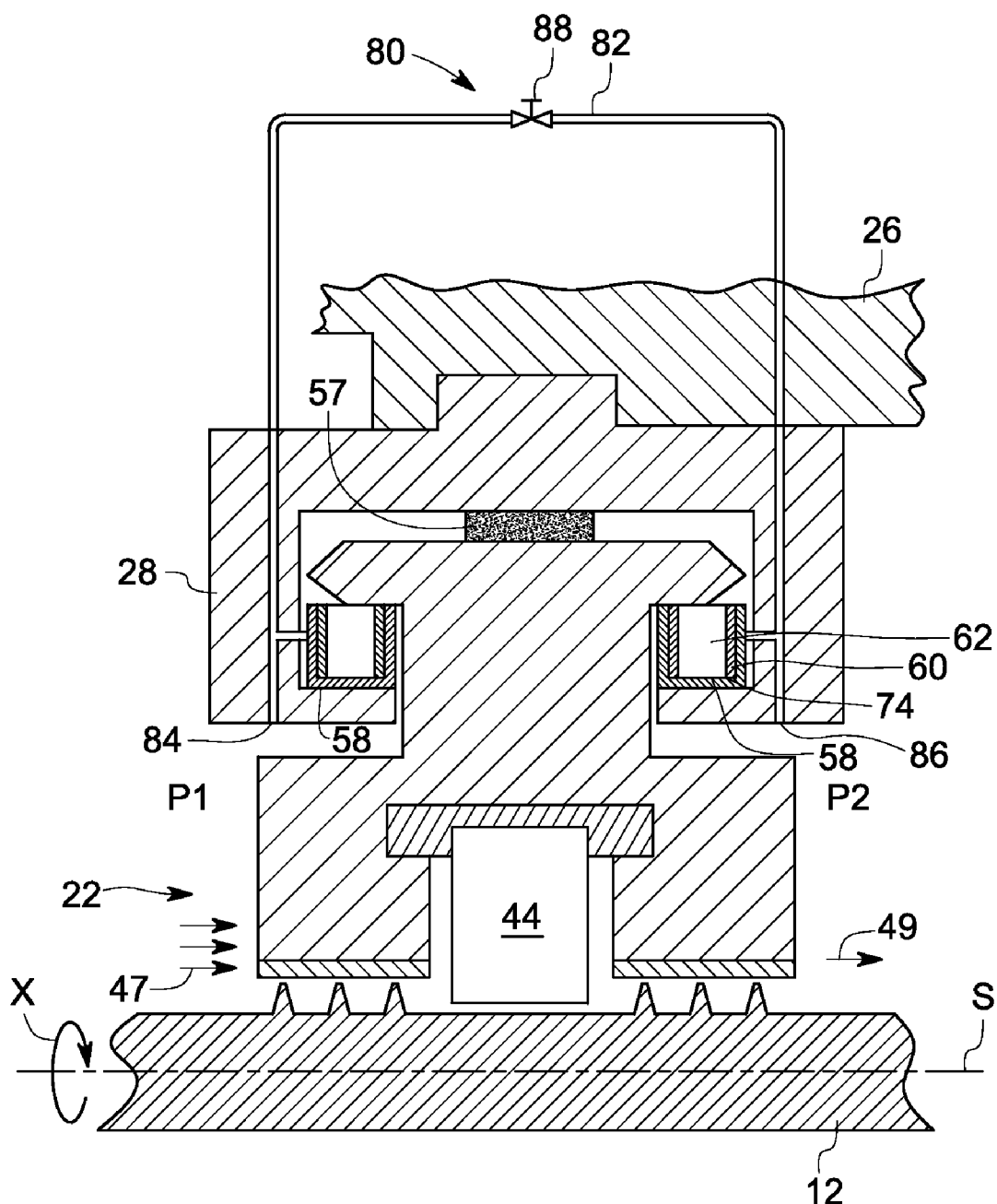
FIG. 10 illustrates a seal assembly according another embodiment of the invention.

Referring to FIG. 10, a trigger device 80, according to another embodiment of the invention, is shown. Trigger device 80 includes at least one conduit or pipe 82 having an inlet 84 disposed at high pressure area 47 and an outlet 86 disposed at the low pressure area 49, and communicates with manifold 72 (FIGS. 6 and 7) of carrier 58. The conduit 90 may extend from high pressure area 47 to low pressure area 49 via the supporting member 28 and stationary casing 26. The conduit 82 is provided with at least one by-pass control valve 88 for controlling flow of fluid through conduit 82. The valve 88 may be operated manually or automatically. Automatic operation can be either direct or in conjunction with a machine controller.

When valve 88 is opened, the conduit 82 offers significantly less resistance to steam flow as compared to the leakage between rotor 12 and casing 26 through the seal packet 30. In other words, when the valve 88 is opened, the conduit 82 facilitates to equalize the pressure force P1 and P2 respectively adjacent inlet 84 and outlet 86 allowing seal packet 30 to retract with respect to supporting member 28. The valve 88 directs the fluid around compliant plate seal packet 30 to reduce pressure drop across compliant plate seal packet 30.

At transient operation, such as start up or shut down operation, of steam turbine 10, valve 88 is open to equalize pressure P1 and P2 at high pressure area 47 and low pressure area 49, and the equalized pressure overcomes the biasing force of biasing element 57 to push bellows 74 and pistons 62 to move upwardly. Accordingly compliant plate seal packet 30 is retracted, i.e., open, under the influence of pistons 62. When the valve 88 is closed, seal packet 30 may be moved to a closed position. In certain embodiments, compliant plate seal packet 30 can be retracted away from supporting member 26 whenever a rub between rotor 12 and sealing portion 44 is suspected or imminent.

Figure 11:
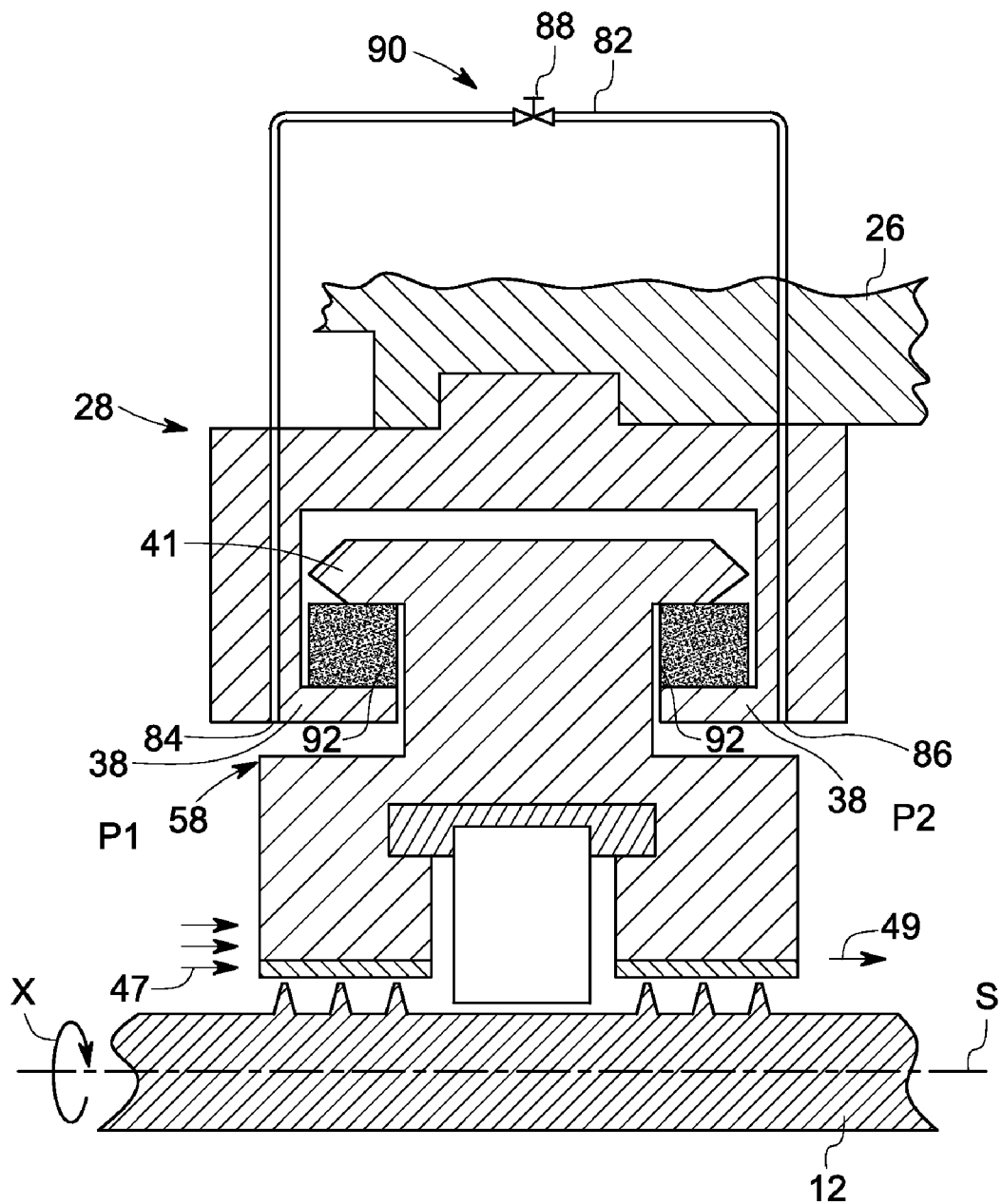
FIG. 11 illustrates a seal assembly according to still another embodiment of the invention.

Referring to FIG. 11, an actuator 90 according to another embodiment of the invention is shown. As illustrated, actuator 90 comprises a pair of spring elements 92, such as spring coils, each between a corresponding ledge 38 and plate member holder 41 of sealing packet 30, and at least one conduit or pipe 82 having an inlet 84 disposed at high pressure area 47 and an outlet 86 disposed at the low pressure area 49. The conduit 82 may extend from high pressure area 47 to low pressure area 49 via the supporting member 28 and stationary casing 26. The conduit 82 is provided with at least one by-pass control valve 88 for controlling flow of fluid through conduit 82. When valve 88 is open, pressures P1 and P2 at high pressure area 47 and low pressure area 49 are equalized, and the spring elements 92 bias seal packet 30 towards supporting member 28 and hold the seal packet 30 at open position. When valve 88 is closed, pressure 47 overcomes the biasing force of spring elements 92 to push seal assembly 30 to move towards rotor 12. Thus, the sealing closure can then be over-ridden via the bypass valve 88.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

The invention claimed is:

1. A steam turbine comprising:
   a steam turbine casing;
   a rotor; and
   at least one compliant plate seal assembly situated between the casing and the rotor, the compliant plate seal assembly comprising:

a supporting member being stationary with respect to the casing, a plurality of plate members movably mounted to the supporting member and extending towards the rotor, each plate member being inclined with respect to a rotation direction of the rotor; and an actuator for selectively exerting a pressure to retract the plate members in a direction away from the rotor, wherein the actuator comprises a carrier, a plurality of bores defined in an outer peripheral surface of the carrier, a plurality of compression members in corresponding bores, and a plurality of pistons attached to the compression members and retained in corresponding bores.

2. The steam turbine of claim 1, wherein the at least one compliant plate seal assembly further comprises a plate support in which the plate members are mounted, wherein the plate support further comprises at least one supplementary sealing portion extending towards the rotor.

3. The steam turbine of claim 2, wherein the at least one supplementary sealing portion comprises an abradable material on a rotor facing end thereof, and wherein the rotor comprises projections oriented substantially perpendicularly with respect to the abradable rotor facing end of the at least one supplementary sealing portion.

4. The steam turbine of claim 1, wherein the actuator further comprises a trigger device for transmitting high pressure gases to the bores of the carrier and pushing the compression members to move toward the casing.

5. The steam turbine of claim 1, wherein the actuator further comprises a manifold for communicating with the bores.

6. The steam turbine of claim 1, wherein the trigger device comprises an external pressure source for actuating the pistons.

7. The steam turbine of claim 6, wherein the trigger device includes at least one conduit with an inlet disposed at a high pressure area and an outlet disposed at a low pressure area of the rotor.

8. The steam turbine of claim 7, wherein the trigger device comprises at least one by-pass control valve for controlling flow of fluid through conduit.

9. A seal assembly comprising:
at least one compliant plate seal assembly situated between a stator and a rotor, the compliant plate seal assembly comprising:
a supporting member being stationary with respect to the stator,
a plate support being movably mounted to the supporting member;
a plurality of plate members mounted to plate support and extending towards the rotor, each plate member being inclined with respect to a rotation direction of the rotor, wherein the plate support further comprises at least one supplementary sealing portion extending towards the rotor and comprising an abradable material on a rotor facing end, and wherein the rotor is provided with projections oriented substantially perpendicularly with respect to the supplementary sealing portion; and
an actuator for selectively exerting a pressure to retract the plate members in a direction away from the rotor.

10. A seal assembly for providing sealing effect between a casing and a rotor surrounded by the casing, the sealing assembly comprising:
at least one seal assembly situated between the casing and the rotor, the seal assembly comprising:
a supporting member being stationary with respect to the casing,
a plurality of sealing portions movably mounted to the supporting member and extending towards the rotor; and
an actuator for selectively exerting a pressure to retract the sealing portions in a direction away from the rotor, the actuator comprising a carrier, a plurality of bores in the carrier, a plurality of compression members between the supporting member and the seal assembly, and a trigger device for selectively exerting a pressure force to lift the compression members,
wherein the carrier comprises a plurality of carrier segments, wherein bores in a common carrier segment are in communication with each other, and wherein bores of different carrier segments are isolated from each other.

11. The seal assembly of claim 10, wherein the sealing portions comprise plate members extending towards the rotor.

* * * * *